US006685138B1

(12) United States Patent
Krantz

(10) Patent No.: US 6,685,138 B1
(45) Date of Patent: Feb. 3, 2004

(54) AUGMENTING FLIGHT CONTROL SURFACE ACTUATION SYSTEM AND METHOD

(75) Inventor: Richard M. Krantz, Renton, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/303,271

(22) Filed: Nov. 25, 2002

(51) Int. Cl.[7] .............................................. B64C 13/36
(52) U.S. Cl. ............................ 244/78; 244/226; 91/517
(58) Field of Search ................................. 244/75 R, 78, 244/76 C, 221, 226, 227; 91/176, 177, 183, 508, 511, 517

(56) References Cited

U.S. PATENT DOCUMENTS

| 5,600,220 | A | * | 2/1997 | Thoraval et al. ............. 318/562 |
| 6,082,106 | A | * | 7/2000 | Hamamoto .................. 60/422 |
| 6,209,825 | B1 | * | 4/2001 | Scott .......................... 244/226 |
| 6,298,661 | B1 | * | 10/2001 | Holder et al. ................. 60/451 |
| 6,438,953 | B1 | * | 8/2002 | Kamada ....................... 60/422 |

* cited by examiner

Primary Examiner—J. Woodrow Eldred
(74) Attorney, Agent, or Firm—Harness Dickey & Pierce P.L.C.

(57) ABSTRACT

Apparatus for providing actuation power to an aircraft flight control surface. The apparatus includes a first actuator and a second actuator, where the second actuator has a bypass mode and an assist mode. The mode of the second actuator is determined by an internal differential pressure across the first actuator. The apparatus further includes a mode select valve for selecting between the bypass mode and the assist mode for the second actuator, and a solenoid valve that when energized causes the mode select valve to select the other mode for the second actuator. When the second actuator is in the bypass mode, the first actuator provides the actuation power for the aircraft flight control surface. But, when the second actuator is in the assist mode, both the first and second actuators provide the actuation power for the aircraft flight control surface. Accordingly, the apparatus allows the flight control surface to be operated in a more efficient manner with less hydraulic flow being required.

20 Claims, 7 Drawing Sheets

AUGMENTING FLIGHT CONTROL SURFACE ACTUATION SYSTEM AND METHOD

FIELD OF THE INVENTION

The present invention relates generally to aircraft and more particularly to flight control surface actuation systems.

BACKGROUND OF THE INVENTION

Power Control Units (PCU) are used to apply loads for positioning and maintaining the position of aircraft flight control surfaces such as ailerons, elevators, rudders, spoilers, etc. Conventional PCUs are typically sized for stall load and a required rate. The required rate typically involves low loads, either a no-load condition, a low-load condition, or a maximum allowable time to travel from surface faired to a specified surface position under specific flight conditions. For simplicity, subsequent discussions herein shall assume a no-load rate requirement. Stall load is referred to as the maximum amount of force that the PCU actuator can exert. The maximum no-load rate refers to the fastest rate at which an actuator piston can move when the control valve is wide open and no load is on the actuator.

Sizing a PCU according to a stall load and a required rate leads to inefficiencies due to flight dynamics. That is, conventional PCUs are relatively inefficient in terms of the required horsepower and hydraulic system weight under high rate and low load conditions (e.g., near "aerodynamic neutral" or no load for the flight control surface). The term "aerodynamic neutral" refers to the position of the flight control surface at which the net air load on the surface is zero such as when the pressure below a horizontally-oriented flight control surface is equal to the pressure above the surface.

SUMMARY OF THE INVENTION

Accordingly, a need exists for a flight control surface actuation system and method that is highly efficient and well suited for use with the present day commercial aircraft. The system should substantially reduce the hydraulic fluid flow and horsepower required to provide sufficient actuation power to meet the actuation requirements during normal and emergency flight conditions of the aircraft. Ideally, the system should provide a stall load and a maximum no-load rate that are at least comparable (i.e., substantially identical) with conventional PCUs.

In one preferred form, the present invention provides an apparatus for providing actuation power to an aircraft flight control surface. The apparatus includes a first actuator and a second actuator, where the second actuator has a bypass mode and an assist mode. The mode of the second actuator is based upon the internal differential pressure across the first actuator. The apparatus further includes a mode select valve for selecting between the bypass mode and the assist mode for the second actuator, and a solenoid valve that when energized causes the mode select valve to select the other mode for the second actuator. When the second actuator is in the bypass mode, the first actuator provides the actuation power for the aircraft flight control surface. But, when the second actuator is in the assist mode, both the first and second actuators provide the actuation power for the aircraft flight control surface. Accordingly, the apparatus allows the flight control surface to be operated in a more efficient manner with less hydraulic flow being required.

Further areas of applicability of the present invention will become apparent from the detailed description provided hereinafter. It should be understood that the detailed description and specific examples, while indicating at least one preferred embodiment of the invention, are intended for purposes of illustration only and are not intended to limit the scope of the invention.

BRIEF DESCRIPTION OF THE DRAWINGS

The present invention will be more fully understood from the detailed description and the accompanying drawings, wherein.

Corresponding reference characters indicate corresponding features throughout the drawings.

DETAILED DESCRIPTION OF THE PREFERRED EMBODIMENTS

Figure 1:
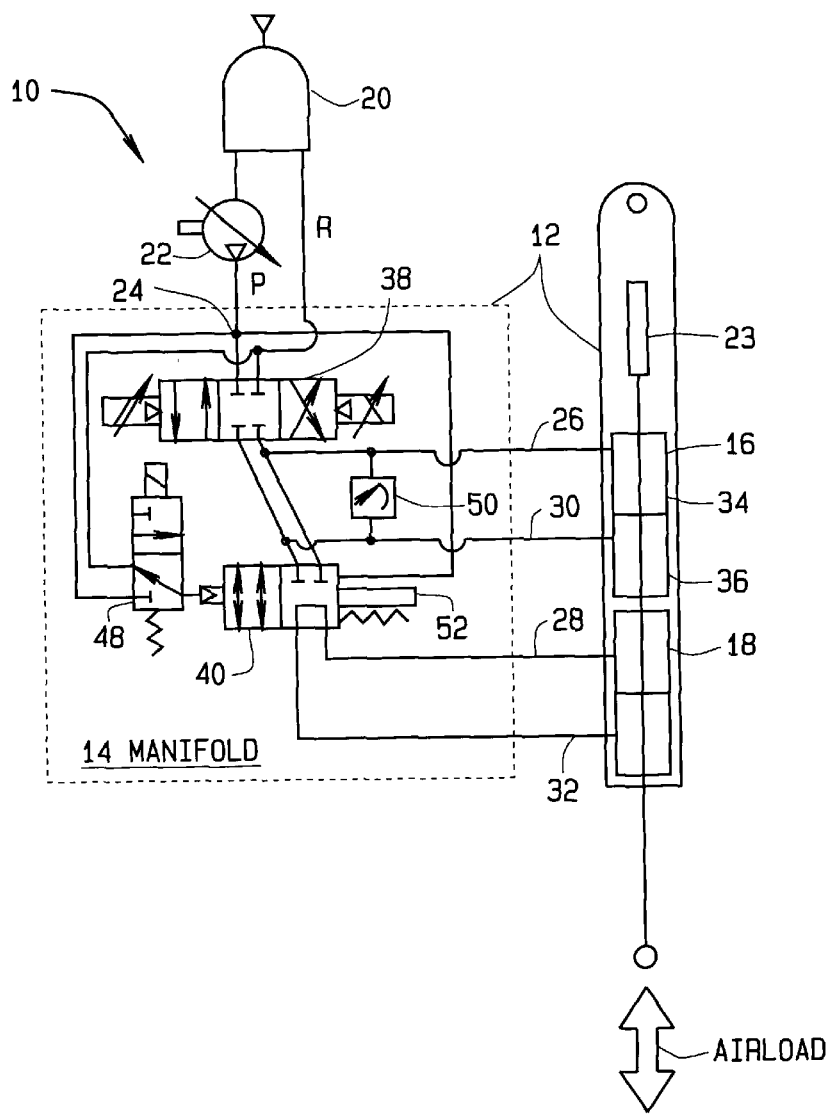
FIG. 1 is a schematic diagram of an augmenting flight control surface actuation system with dual actuators positioned in tandem according to a first preferred embodiment of the present invention.

Referring to FIG. 1, there is shown an augmenting flight control surface actuation system, generally indicated by reference number 10, according to one preferred embodiment of the present invention. Generally, the system 10 comprises an augmenting PCU 12 that includes a manifold 14, a first actuator 16, and a second actuator 18 that has an assist mode and bypass mode. The augmenting PCU 12 is fluidically connected to a pressure source P (e.g., a fluid reservoir 20 and a pump 22) that supplies the augmenting PCU 12 with a pressurized working fluid. During use, the operating mode (i.e., assist and bypass) of the second actuator 18 is at least partially based upon the internal differential pressure across the first actuator 16 such that the secondary actuator 18 does not absorb any hydraulic pressure until high loads are required.

During low load conditions, the second actuator 18 is bypassed and remains in a passive or standby mode such that the first actuator 16 provides the actuation power for the flight control surface. But, the first and second actuators 16 and 18 are both pressurized and used to provide actuation power for the flight control surface when high load operating conditions exist (e.g., when high hinge moment demands exist).

Accordingly, the augmenting PCU 12 allows the flight control surface to be operated with less hydraulic flow than a conventional PCU configuration. As used herein, "conventional PCUs" include single-actuator configurations and multi-actuator configurations wherein each of the multiple actuators is associated with its own complete hydraulic system (e.g., pump and reservoir) and the multiple actuators are used in combination to operate a flight control surface such that an equivalent amount of fluid is required to achieve the same actuation power as a single actuator.

The augmenting PCU 12 requires substantially less hydraulic fluid flow to provide a stall load and a maximum no-load rate that are at least comparable (i.e., substantially identical) to that which is provided by conventional PCUs. Compared to conventional PCUs, the augmenting PCU 12 is more efficient and reduces hydraulic horsepower demands because the lower hydraulic fluid flow demands translate into less horsepower extraction from the engines. Moreover, the augmenting PCU 12 allows for the use of smaller aircraft hydraulic pumps and smaller diameter hydraulic fluid distribution lines, which in turn leads to significant cost and weight reductions and improved fuel efficiency.

It should also be noted that the augmenting flight control surface actuation system 10 shown in FIG. 1 is for illustration purposes only. In other embodiments, other manifolds, control valves and hydraulic systems may be used depending at least in part on the particular actuators used and the particular aircraft in which the system 10 will be used.

With further reference to FIG. 1, the fluid reservoir 20 and pump 22 supply the pressurized working fluid to the augmenting PCU 12. The pump 22 may comprise any of a wide range of pumps including hydraulic pumps, engine driven pumps, electrically driven pumps, air or wind driven pumps, ram air turbine (RAT) pumps, among others.

As explained in greater detail below, the pump 22 increases the pressure of, and pumps a working fluid from, the reservoir 20 into the augmenting PCU 12 via a pressure port or inlet 24. The pressure at which the working fluid enters the augmenting PCU 12 as well as the pressure of the working fluid within the reservoir 20 will likely depend at least in part on the application in which the system 10 is being used. By way of example only, the reservoir pressure of the fluid may be about 50 pounds per square inch (psi), and the pump 20 may increase the fluid pressure from about 50 psi up to about 3000 psi.

After the working fluid has been used by and thus circulated through the augmenting PCU 12, the working fluid is returned back to the reservoir 20 at the reservoir pressure. From the reservoir 20, the working fluid is again supplied to the pump 22. Accordingly, the system 10 constitutes a closed fluid system.

Figure 2:
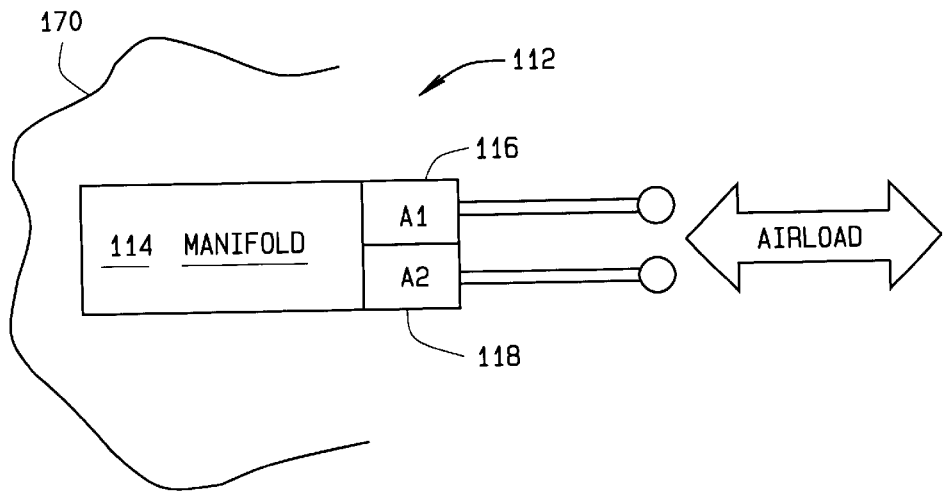
FIG. 2 is a top view, block diagram illustrating an augmenting PCU having dual actuators positioned in parallel according to a second embodiment of the present invention.
Figure 3:
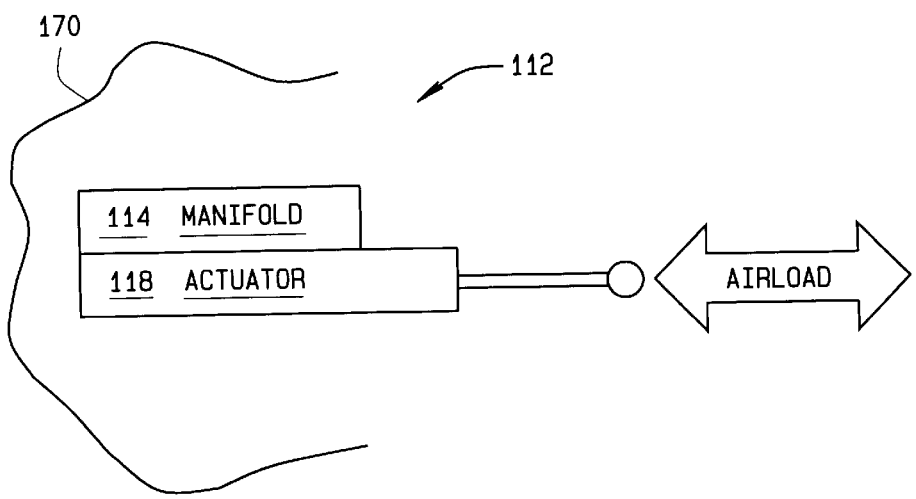
FIG. 3 is a side view, block diagram of the augmenting PCU shown in FIG. 2.

The system 10 also includes the first and second actuators 16 and 18 and a linear variable differential transformer (LVDT) 23 for sensing the respective positions of the actuators 16 and 18. In FIG. 1, the actuators 16 and 18 are shown positioned in tandem (i.e., end-to-end). However, and as shown in FIGS. 2 and 3, an alternative PCU embodiment 112 includes a manifold 114 and first and second actuators (A1, A2) 116 and 118 that are positioned in parallel within the wing 170. The positioning of the actuators will likely depend at least in part on the geometry of the wing and the available space in which the actuators are being installed.

In addition, the system 10 may also include more than two actuators (i.e., three or more actuators) with the number of actuators being used depending at least in part on the space available for installing the actuators, actuation power needed, among others factors. For example, in an alternative embodiment, the system may be configured to include one primary actuator and two secondary actuators wherein each of the secondary actuators has an independently controlled assist mode and bypass mode.

The first and second actuators 16 and 18 may comprise any of a wide range of actuators now known in the art or that may be developed in the future. Even though actuators are well-known in the art, a brief description of an exemplary actuator will be given in order to provide a more understandable basis for understanding the present invention.

Briefly, each actuator 16 and 18 includes a piston that is movably disposed within an actuator barrel. Each actuator also includes a shaft or rod. One end of the shaft is engaged with the piston while the other end is engaged with the flight control surface.

The actuator barrel is fluidically connected to the fluid reservoir 20 and pump 22 via an extend fluid conduit (e.g., 26 and 28) and a retract fluid conduit (e.g., 30 and 32). Each actuator barrel is sized such the piston moves within the barrel when the barrel receives a supply of pressurized working fluid from the reservoir 20 and pump 22. The actuator barrel includes end caps and fluidic sealing members (e.g., o-rings, etc.) to fluidically seal the actuator barrel so that the pressurized working fluid is prevented from escaping the actuator barrel other than by the corresponding fluid conduit.

As shown in FIG. 1, each actuator 16 and 18 is fluidically connected to the manifold 14 via a respective extend fluid conduit or line 26, 28 and a respective retract fluid conduit or line 30, 32. When provided with the pressurized working fluid, the flow direction of the pressurized working fluid determines whether the actuators 16 and 18 extend or retract and thus operate to retract or extend the flight control surface. For example, the first actuator's 16 piston extends when the pressurized working fluid enters the extend side 34 of the first actuator 16 via the extend fluid conduit 26. The working fluid is discharged from the retract side 36 of the first actuator 16 via the retract fluid conduit 30 for return to the reservoir 20. Conversely, the first actuator's 16 piston retracts when the pressurized working fluid is provided to the retract side 36 via its retract fluid conduit 30. In this latter instance, the working fluid is discharged from the extend side 34 of the first actuator 16 via the extend fluid conduit 26 for return to the reservoir 20.

Although the first and second actuators 16 and 18 may be substantially identical, such need not be the case. For example, the second actuator 18 may have a longer stroke length than the first actuator 16. Or for example, the multiple actuators comprising the augmenting flight control surface actuation system may be sized differently (e.g., first actuator sized for minimum stiffness, second actuator sized for stall loads, etc.). As yet another example, damping can be added to the mode select valve 40 wherein a controlled orifice is provided that can be used to create a pressure differential across the second actuator 18 when the second actuator 18 is in bypass mode to prevent surface flutter and provide dynamic stiffening.

During operation, the manifold 14 receives the pressurized working fluid from the pump 22 and reservoir 20 via the inlet 24. The manifold 14 then distributes the pressurized working fluid to the active actuator(s) (i.e., 16 or 16 and 18). The manifold 14 also receives the working fluid from the active actuator(s) after the working fluid has been used thereby. Accordingly, the manifold 14 controls the operation of the first and second actuators 16 and 18.

In the illustrated embodiment, the manifold 14 includes a control valve 38 for determining the flow direction and the amount of pressurized working fluid to the mode select valve 40. Preferably, the control valve 38 utilizes an electro-hydraulic servo valve (EHSV), although other valve types (e.g., direct drive valve (DDV), among others) are also possible.

Regarding the mode select valve 40, the mode select valve 40 is used to select between the bypass mode and the assist mode for the second actuator 18. Accordingly, the mode select valve 40 includes a bypass setting and an assist setting. When the mode select valve 40 is in its bypass setting, the second actuator 18 is bypassed such that the first actuator 16 provides the actuation power for the flight control surface. Conversely, the first and second actuators 16 and 18 are both pressurized and used to provide the actuation power for the flight control surface when the mode select valve 40 is in its assist setting.

Figure 4:
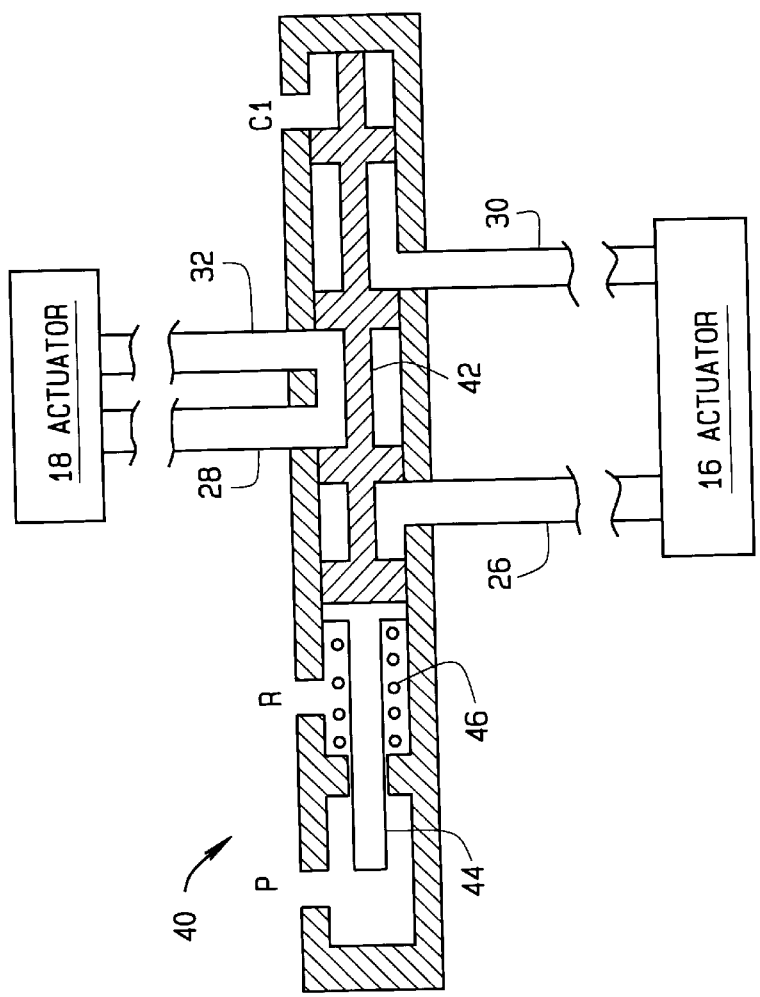
FIG. 4 is a cross-sectional side view of the mode select valve shown in FIG. 1.

Referring now to FIG. 4, there is shown a cross-sectional view of the mode select valve 40 in its bypass setting. The mode select valve 40 includes a slide 42 that is moveable between a first position and a second position. The mode select valve further includes a plunger 44 and a biasing device 46 (e.g., a coil spring, hydraulic pressure, etc.) for biasing the slide 42 in its first position. As shown, the mode select valve 40 is in its bypass setting when the slide 42 is in the first position.

Referring back to FIG. 1, the manifold 14 further includes a solenoid valve 48 that is used for causing the mode select valve 40 to change between its two settings (i.e., bypass setting and assist setting). That is, the solenoid valve 48 is used to move the slide 42 of the mode select valve 40 between its first and second positions. Accordingly, the setting of the mode select valve 40 and thus the mode of the second actuator 18 are both dependent upon the status (i.e. energized, de-energized) of the solenoid valve 48. Preferably, energizing the solenoid valve 48 causes the mode select valve 40 to change from its bypass setting to its assist setting, which in turn changes the mode of the second actuator 18 from its bypass mode to its assist mode.

Using the solenoid valve 48 to control the positioning of the slide 42 of mode select valve 40 allows for greater controllability of the system 10 relative to hysteresis. The solenoid valve 48 ensures that the transition of the mode select valve 40 between its bypass and assist settings is relatively quick or "snap-acting." As used herein, "snap-acting" involves two features, namely, that the transition between valve operating modes is relatively fast and that there are no normal operating conditions wherein the valve transitions only part-way (i.e., the valve does not stop at a position that is neither fully opened nor fully closed). It should be noted, however, that other valve configurations could be utilized depending on the flight control system architecture without departing from the spirit and scope of the invention.

With further reference to FIG. 1, the status of the solenoid valve 48, and thus the mode of the second actuator 18, is preferably based upon the internal differential pressure across the first actuator 16. To this end, the system 10 includes a differential pressure sensor 50 installed between the first actuator's 16 extend and retract lines 26 and 30. The differential pressure sensor 50 determines the pressure differential across the first actuator 16 by subtracting the pressure of the working fluid leaving the first actuator 16 from the pressure of the working fluid entering the first actuator 16.

The system 10 may be configured such that the solenoid valve 48 is energized when the differential pressure across the first actuator 16, as measured by the sensor 50, exceeds a maximum pressure value for a corresponding time period. Conversely, the solenoid valve 48 may be de-energized when the differential pressure across the first actuator 16, as measured by the sensor 50, subsequently drops or falls below a minimum pressure value for a given time period.

By way of example only, the system 10 may be installed in an exemplary aircraft that uses a fly-by-wire flight control system architecture. The aircraft may include an actuator control electronics (ACE) box for controlling the solenoid valve 48 and a 3000 psi hydraulic system designed such that 2100 psi will be available to the flight control actuators under all flight conditions. In this exemplary aircraft, the solenoid 48 may be energized when the ACE senses that the first actuator's 16 internal differential pressure exceeds 2100 psi for more than 50 milliseconds. When the ACE senses that the first actuator's 16 internal differential pressure drops below 950 psi for more than 50 milliseconds, the solenoid may be de-energized. The values selected for the maximum and minimum pressure values and the time periods that are used to determine when the solenoid valve 48 is energized and de-energized, however, may vary depending at least in part on the application in which the system 10 is being used and on the required switching hysteresis.

As shown in FIG. 4, the mode select valve 40 includes three hydraulic ports, namely a pressure port P, a return port R, and a solenoid control port C1. The pressure port P is fluidically connected to the system's 10 pressure source P (i.e., reservoir 20 and pump 22). The return port R is fluidically connected to the system's 10 return source R (i.e., reservoir 20). The pressure and return ports P and R are used to provide a hydraulic bias to the slide 42 via the plunger 44. The spring 46 also provides a bias to the slide 42, even when hydraulic pressure is off.

The solenoid valve 48 is normally closed when de-energized such that the mode select valve 40 is in its bypass setting. Accordingly, the solenoid control port C1 is fluidically connected to the system's 10 return source R when the solenoid valve 10 is de-energized. However, when the solenoid valve 48 is energized, the control port C1 is fluidically connected to the system's 10 pressure source P. Alternatively, the system may instead include a normally open solenoid valve (i.e., C1 pressurized when solenoid valve is de-energized) such that the default mode for the mode select valve is the assist setting. For this alternative, other valve changes, such as reversing the direction of spring bias, would also be required.

Energizing the solenoid valve 48 fluidically connects the control port C1 to the pressure source P. The pressurized working fluid entering the mode select valve 40 via the control port C1 and working on the larger diameter side of slide 42, will eventually overcome the biasing force of the coil spring 46 and pressure P working on the smaller diameter side of plunger 44, applied to the slide 42 by way of the plunger 44. At that point, the slide 42 will shift or move to the left from its first position to its second position, thus changing the setting of the mode select valve 40 from its bypass setting to its assist setting. When the mode select valve 40 is in the bypass setting, the first actuator's 16 extend and retract lines 26 and 30 are in fluid communication with the second actuator's 18 extend and retract lines 28 and 32, respectively. Accordingly, actuation power is provided by both actuators 16 and 18.

Depending on the application in which the system 10 is used, the flight control system architecture might require that the position of the mode select valve 40 be monitored. Accordingly, the manifold 14 further includes a linear variable differential transformer (LVDT) 52 for determining the setting of the mode select valve 40. That is, the LVDT 52 determines whether the mode select valve 40 is in either its bypass or assist setting.

Figure 5A:
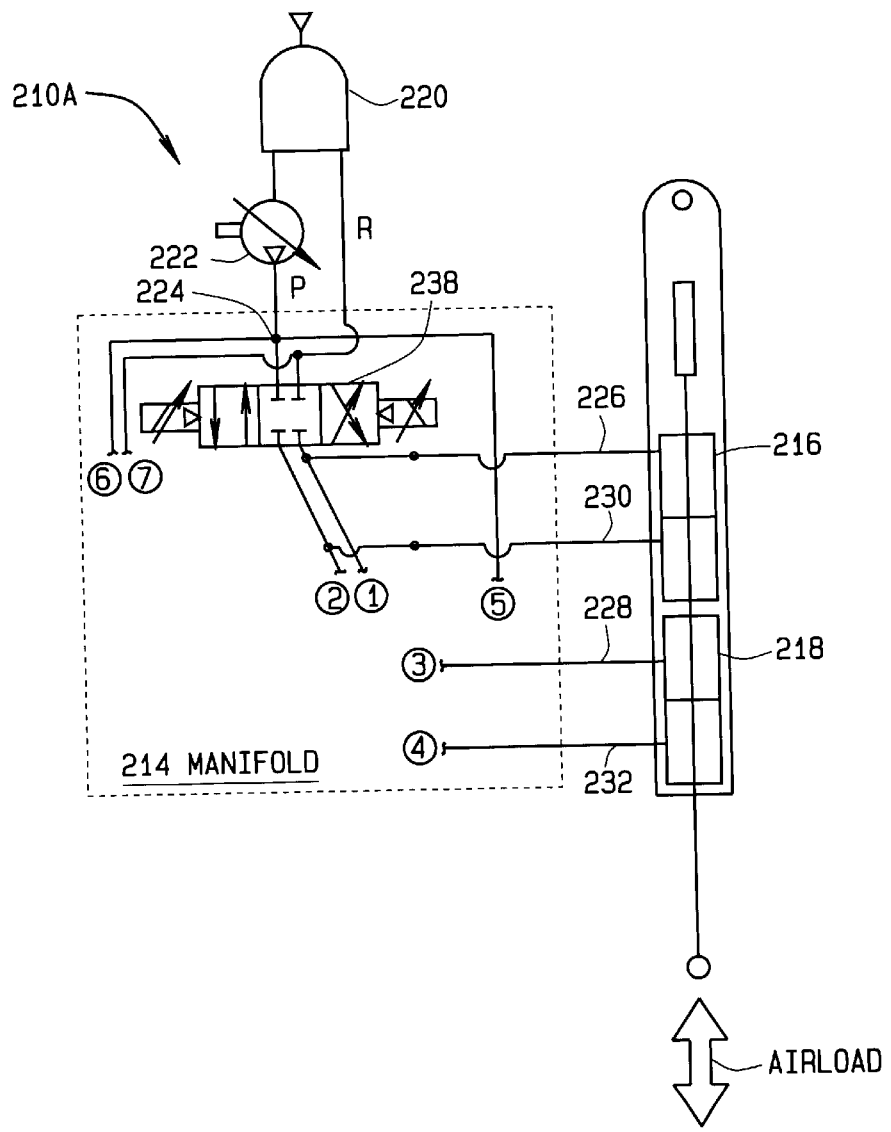
FIGS. 5A and 5B form a schematic diagram of an augmenting flight control surface actuation system according to a second preferred embodiment of the present invention.
Figure 5B:
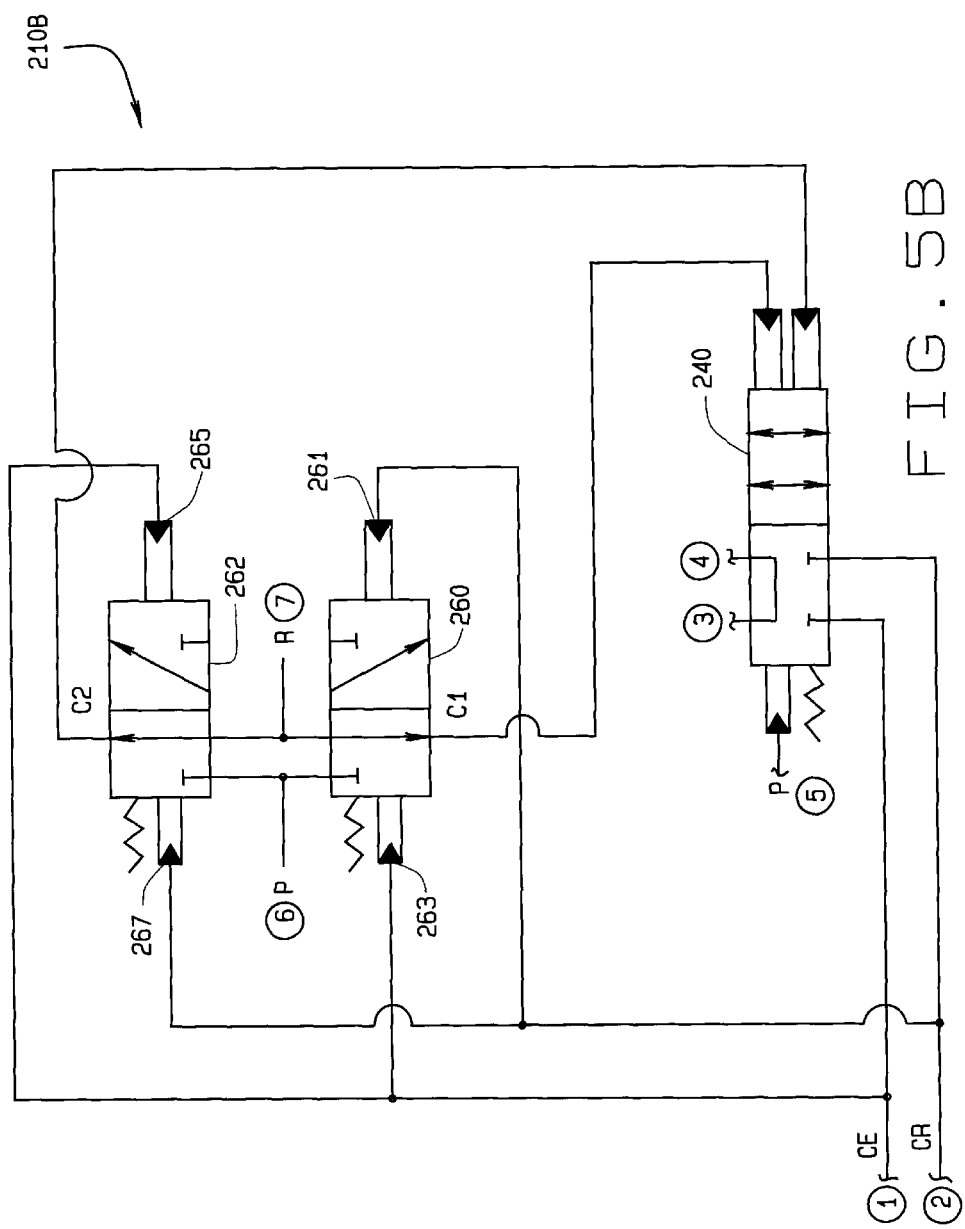

Referring now to FIGS. 5A and 5B, there is shown a second embodiment 210 of the augmenting flight control surface actuation system. The system 210 comprises a control valve 238, a mode select valve 240, and a pair of delta pressure sense valves 260 and 262. The delta pressure sense valves 260 and 262 are configured such that one or the other will fully open when an internal pressure differential across the corresponding valve 260 or 262 exceeds a predetermined level, which may comprise any of a wide range of pressure values.

The delta pressure sense valve 260 prevents or blocks pressure to the mode select valve 240 until the difference between the pressure at port 261 and the pressure at port 263 exceeds the valve setting or cracking pressure of the delta pressure sense valve 260. When the internal differential pressure across the delta pressure sense valve 260 exceeds the cracking pressure, the delta pressure sense valve 260 fully opens in a substantially instantaneous or snap-acting manner.

The delta pressure sense valve 262 prevents or blocks pressure to the mode select valve 240 until the difference between the pressure at port 265 and the pressure at port 267 exceeds the valve setting or cracking pressure of the delta pressure sense valve 262. When the internal differential pressure across the pressure sense valve 262 exceeds the cracking pressure, the delta pressure sense valve 262 fully opens in a substantially instantaneous or snap-acting manner.

The cracking and reset pressure for each of the delta pressure sense valves 260 and 262 may comprise any of a wide range of pressure values. The reset differential pressure required to reset the opened valve 260 or 262 may vary depending on the particular application in which the system 10 is being used. Moreover, the reset differential pressure for the delta pressure sense valves 260 and 262 can be varied by changing the hydraulic or piston area ratios for the delta pressure sense valves 260 and 262. By way of example only, the delta pressure sense valves 260 and 262 may each be configured to fully open when the internal pressure differential across the corresponding delta pressure sense valve 260 or 262 exceeds 2100 psi. By way of further example, the delta pressure sense valves 260 and 262 may also be configured to reset when the internal pressure differential across the corresponding delta pressure sense valve 260 or 262 falls below 950 psi.

Figure 6:
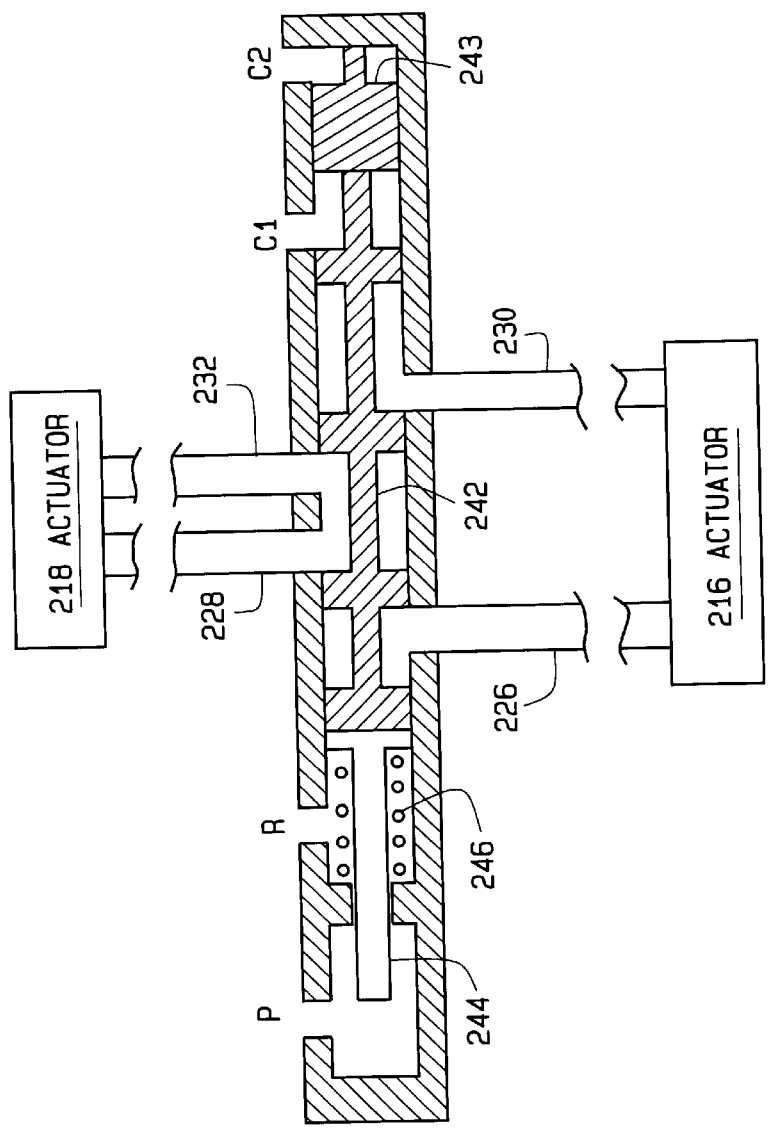
FIG. 6 is a cross-sectional side view of the mode select valve shown in FIG. 5B.

Referring now to FIG. 6, there is shown a cross-sectional view of the mode select valve 240 in its bypass setting. The mode select valve 240 includes a first slide 242 and a second slide 243, each of which are moveable between a first and second position. The mode select valve further includes a plunger 244 and a biasing device 246 (e.g., a coil spring, hydraulic pressure, etc.) for biasing the slide 242, and thus the slide 243, in their first positions. As shown, the mode select valve 40 is in its bypass setting when the slides 242 and 243 are both in the first position.

The mode select valve 240 includes four hydraulic ports, namely a pressure port P, a return port R, and control port C1 and C2. The pressure port P is fluidically connected to the system's 210 pressure source P (i.e., reservoir 220 and pump 222). The return port R is fluidically connected to the system's 210 return source R (i.e., reservoir 20). The pressure and return ports P and R are used to provide a hydraulic bias to the slide 242 via the plunger 244. The spring 246 also provides a bias to the slide 242, even when hydraulic pressure is off. The control port C1 is fluidically connected to the delta pressure sense valve 260, whereas the control port C2 is fluidically connected to the delta pressure sense valve 262.

Activating or opening the delta pressure sense valve 260 fluidically connects the control port C1 to the pressure source P via the opened valve 260. The pressurized working fluid entering the mode select valve 240 via the control port C1 and working on the larger diameter side of slide 242, will eventually overcome the biasing force of the coil spring 246 and pressure P working on the smaller diameter side of plunger 244, applied to the slide 242 by way of the plunger 244. At that point, the slide 242 will shift or move to the left from its first position to its second position, thus changing the setting of the mode select valve 240 from its bypass setting to its assist setting. When the mode select valve 240 is in the bypass setting, the first actuator's 216 extend and retract lines 226 and 230 are in fluid communication with the second actuator's 218 extend and retract lines 228 and 232, respectively. Accordingly, actuation power is provided by both actuators 216 and 218.

Activating or opening the delta pressure sense valve 262 fluidically connects the control port C2 to the pressure source P via the opened valve 262. The pressurized working fluid entering the mode select valve 240 via the control port C2 and working on the larger diameter side of slide 243, will eventually overcome the biasing force of the coil spring 246 and pressure P working on the smaller diameter side of plunger 244, applied to the slide 242 by way of the plunger 244. At that point, the slides 242 and 243 will both shift or move to the left from their first positions to their second positions, thus changing the setting of the mode select valve 240 from its bypass setting to its assist setting. When the mode select valve 240 is in the bypass setting, the first actuator's 216 extend and retract lines 226 and 230 are in fluid communication with the second actuator's 218 extend and retract lines 228 and 232, respectively. Accordingly, actuation power is provided by both actuators 216 and 218.

Figure 7:
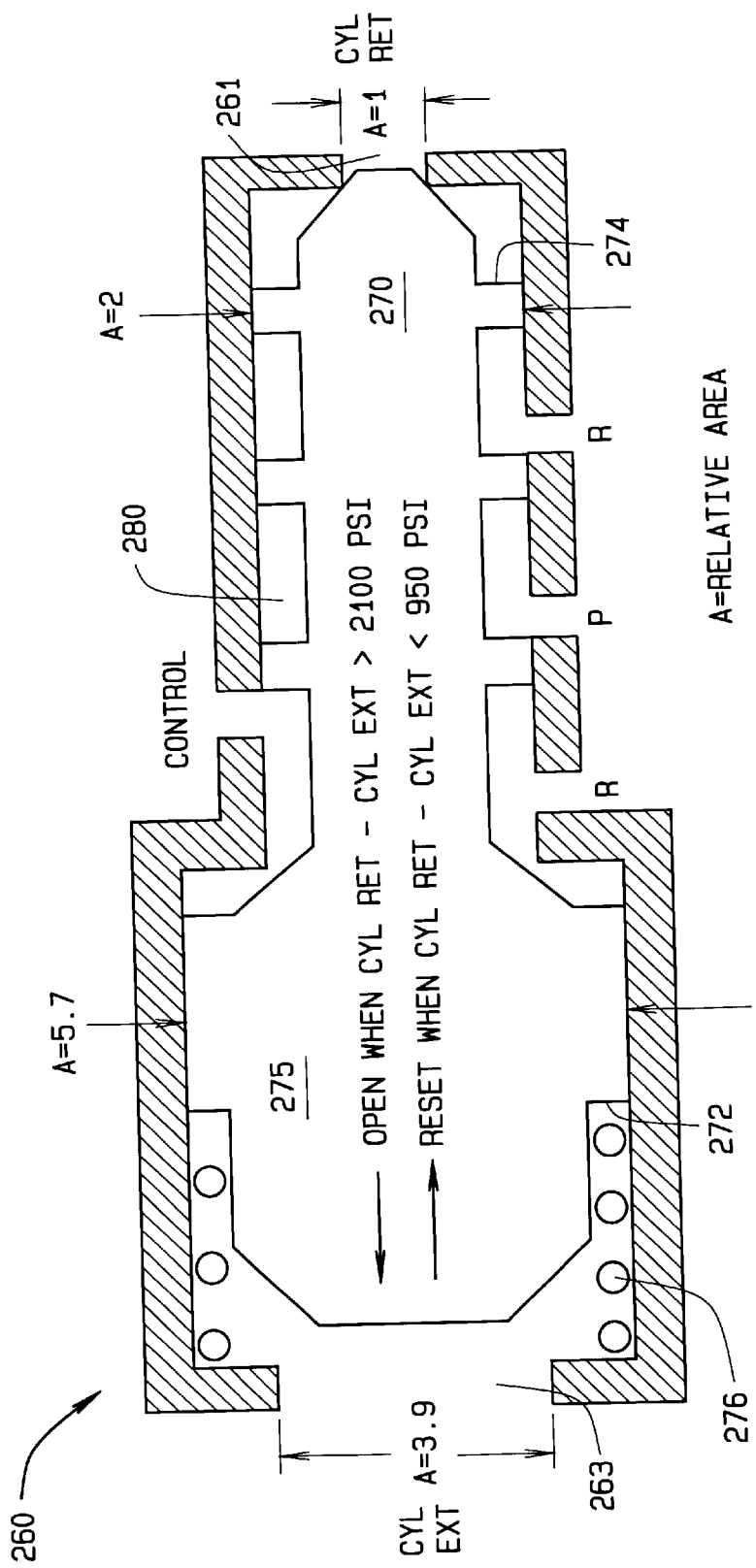
FIG. 7 is a cross-sectional side view of a delta pressure sense valve shown in FIG. 5B.

Referring now to FIG. 7, there is shown a cross-sectional view of the delta pressure sense valve 260. The delta pressure sense 262 may be substantially identical to the delta pressure sense valve 260 shown in FIG. 6, except the valve's 262 Cyl Ext and Cyl Ret are reversed or swapped. That is, the delta pressure sense valve's 262 Cyl Ext and Cyl Ret would appear on the right and the left, respectively, instead of on the left and the right as shown in FIG. 7. It should be noted that the pressure values and relative areas (A) are provided in FIG. 7 for purposes of illustration only and not for limitation. Other pressure values and relative areas may be used depending on the particular application in which the system 210 is being used.

The delta pressure sense valve 260 includes a slide 270 moveable between a first and second position. The delta pressure sense valve 260 further includes a plunger 275 and a biasing device 276 (e.g., a coil spring, hydraulic pressure, etc.) for biasing the slide 270 in its first position. As shown, the valve 260 is in its closed setting when the slide 270 is in its first position.

The delta pressure sense valve 260 includes ports 261 and 263, a pressure port P, return ports R, and a control port C. The ports 261 and 263 are fluidically connected to the control valve 238, as shown in FIGS. 5A and 5B. The pressure port P is fluidically connected to the system's 210 pressure source P (i.e., reservoir 220 and pump 222). The return port R is fluidically connected to the system's 210 return source R (i.e., reservoir 20).

The pressure and return ports P and R are used to provide a hydraulic bias to the slide 270. The spring 276 also provides a bias to the slide 270 via the plunger 275, even when hydraulic pressure is off. When the delta pressure sense valve 260 Opens, the control port C is fluidically connected to the pressure port P via a substantially annular chamber 280 defined by the valve 260.

In addition, the delta pressure sense valve 260 also defines a plurality of lands. In the illustrated embodiment of FIG. 7, the delta pressure sense valve 260 defines lands 272 and 274 each of which allows lap leakage there across.

During operation, the actuation power is provided by the first actuator 216 when the delta pressure sense valves 260 and 262 are both closed. However, the actuation power is provided by the first and second actuators 216 and 218 whenever either of the delta pressure sense valves 260 and 262 is fully open (i.e., when the internal pressure differential between the valve's 260 ports 261 and 263 or between the valve's 262 ports 265 and 267 exceeds the cracking pressure for the corresponding delta pressure sense valve 260 or 262). Accordingly, the second actuator 218 is pressurized when the first actuator 216 must endure high pressures.

In another form, the present invention also provides methods of providing actuation power to an aircraft flight control surface. In one preferred embodiment, the method comprises the steps of: using a mode select valve 40 and a solenoid valve 48 to actively control the selection between a bypass mode and an assist mode for a second actuator 18, the selection being at least partially based on an internal pressure differential across a first actuator 16; using the first actuator 16 to provide the actuation power for the aircraft flight control surface when the second actuator 18 is in the bypass mode; and using the first and second actuators 16 and 18 to provide the actuation power for the aircraft flight control surface when the second actuator 18 is in the assist mode.

In another preferred method embodiment, the method comprises the steps of: using a mode select valve 240 and delta pressure sense valves 260 and 262 to control the selection between a bypass mode and an assist mode for a second actuator 218, the selection being at least partially based on an internal pressure differential across the delta pressure sense valves 260 and 262; using the first actuator 216 to provide the actuation power for the aircraft flight control surface when the second actuator 218 is in the bypass mode; and using the first and second actuators 216 and 218 to provide the actuation power for the aircraft flight control surface when the second actuator 218 is in the assist mode.

Accordingly, the present invention provides an augmenting flight control actuation system that substantially reduces the hydraulic fluid flow and horsepower demands while providing sufficient actuation power to meet the actuation requirements during normal and emergency conditions of the aircraft. Indeed, the present invention requires substantially less hydraulic fluid flow to provide a stall load and a maximum no-load rate that are at least comparable (i.e., substantially identical) with conventional PCUs. In addition, the present invention is relatively simplistic, easy to implement, and inexpensive.

The reduced hydraulic flow demands provided by the invention translates into less horsepower extraction from the engines, smaller and lighter hydraulic pumps, and smaller diameter hydraulic fluid distribution lines and tubing. The invention also allows for a reduction in the size of the manifold by way of the internal fluid flow passages and components being sized for less flow. Accordingly, the invention provides both cost and weight reductions in flight control systems, which can be especially beneficial to the increasingly weight conscious commercial aircraft development. The invention also reduces hydraulic system transients during PCU operation, which in turn reduces the need for adding accumulators solely to dampen transients.

The invention utilizes flight proven and mature aircraft technology, thus making it a very reliable approach. For example, the present invention can be used with existing hydraulic pumps, hydraulic seals, solenoid controlled mode switching, aluminum manifolds, and 3000 psi hydraulic systems.

Because the present invention does not rely on the flight regime of the aircraft to determine the actuator affective area but instead relies upon internal PCU pressure, the present invention is well suited for use with subsonic commercial aircraft, among other aircraft. In addition, many aircraft have very thin wings which provide very small envelopes for packaging a flight control actuator therein. However, the present invention is ideally suited for installation within thin wings in that it allows for multiple actuators to be stacked in tandem or parallel. The present invention is also compatible with a wide range of system architectures including mechanical, conventional, power-by-wire, and fly-by-wire system architectures.

It is anticipated that the invention will be applicable to any of a wide range of control surfaces (e.g., but not limited to, ailerons, elevators, rudders, spoilers, flaperons, among others) and any of wide range of aircraft (e.g., but not limited to, fighter jets, commercial jets, private jets, propeller powered aircraft, among others) regardless of the manner in which the aircraft is piloted (e.g., directly, remotely, via automation, or in a combination thereof, among others). Accordingly, the specific references to flight control surface and aircraft herein should not be construed as limiting the scope of the present invention to only one specific form/type of flight control surface or aircraft.

The description of the invention is merely exemplary in nature and is in no way intended to limit the invention, its application, or uses. Thus, variations that do not depart from the substance of the invention are intended to be within the scope of the invention. Such variations are not to be regarded as a departure from the spirit and scope of the invention.

What is claimed is:

1. Apparatus for providing actuation power to an aircraft flight control surface, the apparatus comprising:

a first actuator;

a second actuator including a bypass mode and an assist mode, the mode of the second actuator being at least partially based on an internal pressure differential across the first actuator;

a mode select valve for selecting between the bypass mode and the assist mode for the second actuator;

a solenoid valve operatively associated with the mode select valve such that energizing the solenoid valve causes the mode select valve to select the other one of said modes for the second actuator;

the first actuator providing the actuation power for the aircraft flight control surface when the second actuator is in the bypass mode; and the first and second actuators providing the actuation power for the aircraft flight control surface when the second actuator is in the assist mode.

2. The apparatus of claim 1, wherein the other one of said modes for the second actuator comprises the assist mode.

3. The apparatus of claim 1, wherein the other one of said modes for the second actuator comprises the bypass mode.

4. The apparatus of claim 1, wherein:

the solenoid valve is energized when the internal differential pressure across the first actuator exceeds a maximum pressure value for a corresponding time period; and the solenoid valve is de-energized when the internal differential pressure across the first actuator falls below a minimum pressure value for a given time period.

5. The apparatus of claim 1, further comprising a differential pressure sensor disposed to determine the internal pressure differential across the first actuator.

6. The apparatus of claim 5, wherein:
the first actuator comprises an extend fluid line and a retract fluid line; and
the differential pressure sensor is disposed between the extend fluid line and the retract fluid line of the first actuator.

7. Apparatus for providing actuation power to an aircraft flight control surface, the apparatus comprising:
a first actuator;
a second actuator including a bypass mode and an assist mode, the mode of the second actuator being at least partially based on an internal pressure differential across the first actuator;
a mode select valve for selecting between the bypass mode and the assist mode for the second actuator;
at least one delta pressure sense valve operatively associated with the mode select valve such that opening the delta pressure sense valve causes the mode select valve to select the other one of said modes for the second actuator, the at least one delta pressure sense valve opening when an internal differential pressure across the at least one delta pressure sense valve exceeds a maximum pressure value;
the first actuator providing the actuation power for the aircraft flight control surface when the second actuator is in the bypass mode; and
the first and second actuators providing the actuation power for the aircraft flight control surface when the second actuator is in the assist mode.

8. The apparatus of claim 7, wherein the other one of said modes for the second actuator comprises the assist mode.

9. The apparatus of claim 7, wherein the other one of said modes for the second actuator comprises the bypass mode.

10. The apparatus of claim 7, wherein the at least one delta pressure sense valve comprises:
a first delta pressure sense valve configured to open when an internal pressure differential across the first delta pressure sense valve exceeds a maximum pressure value; and
a second delta pressure sense valve configured to open when an internal pressure differential across the second delta pressure sense valve exceeds a maximum pressure value.

11. Apparatus for providing actuation power to an aircraft flight control surface, the apparatus comprising:
a first actuator;
a second actuator including a bypass mode and an assist mode;
means for controlling the selection of the bypass mode and the assist mode for the second actuator, the mode selection for the second actuator being at least partially based on an internal differential pressure across the first actuator;
the first actuator providing the actuation power for the aircraft flight control surface when the second actuator is in the bypass mode; and the first and second actuators providing the actuation power for the aircraft flight control surface when the second actuator is in the assist mode.

12. An aircraft comprising:
a flight control surface;
a first actuator;
a second actuator including a bypass mode and an assist mode, the mode of the second actuator being at least partially based on an internal pressure differential across the first actuator;
a mode select valve for selecting between the bypass mode and the assist mode for the second actuator;
a solenoid valve operatively associated with the mode select valve such that energizing the solenoid valve causes the mode select valve to select the other one of said modes for the second actuator;
the first actuator providing the actuation power for the aircraft flight control surface when the second actuator is in the bypass mode; and
the first and second actuators providing the actuation power for the aircraft flight control surface when the second actuator is in the assist mode.

13. The aircraft of claim 12, wherein:
the solenoid valve is energized when the internal differential pressure across the first actuator exceeds a maximum pressure value for a corresponding time period; and
the solenoid valve is de-energized when the internal differential pressure across the first actuator falls below a minimum pressure value for a given time period.

14. The aircraft of claim 12, further comprising a differential pressure sensor disposed to determine the internal pressure differential across the first actuator.

15. The aircraft of claim 14, wherein:
the first actuator comprises an extend fluid line and a retract fluid line; and
the differential pressure sensor is disposed between the extend fluid line and the retract fluid line of the first actuator.

16. The aircraft of claim 12, wherein the other one of said modes for the second actuator comprises the assist mode.

17. An aircraft comprising:
a flight control surface;
a first actuator;
a second actuator including a bypass mode and an assist mode, the mode of the second actuator being at least partially based on an internal pressure differential across the first actuator;
a mode select valve for selecting between the bypass mode and the assist mode for the second actuator;
at least one delta pressure sense valve operatively associated with the mode select valve such that opening the delta pressure sense valve causes the mode select valve to select the other one of said modes for the second actuator, the at least one delta pressure sense valve opening when an internal differential pressure across the at least one delta pressure sense valve exceeds a maximum pressure value;
the first actuator providing the actuation power for the aircraft flight control surface when the second actuator is in the bypass mode; and
the first and second actuators providing the actuation power for the aircraft flight control surface when the second actuator is in the assist mode.

18. The aircraft of claim 17, wherein the at least one delta pressure sense valve comprises:
- a first delta pressure sense valve configured to open when an internal pressure differential across the first delta pressure sense valve exceeds a maximum pressure value; and
- a second delta pressure sense valve configured to open when an internal pressure differential across the second delta pressure sense valve exceeds a maximum pressure value.

19. A method of providing actuation power to an aircraft flight control surface, the method comprising:
- using a mode select valve to select between a bypass mode and an assist mode for a second actuator;
- energizing a solenoid valve to cause the mode select valve to select the other one of said modes for the second actuator;
- using the first actuator to provide the actuation power for the aircraft flight control surface when the second actuator is in the bypass mode; and
- using the first and second actuators to provide the actuation power for the aircraft flight control surface when the second actuator is in the assist mode.

20. A method of providing actuation power to an aircraft flight control surface, the method comprising:
- using a mode select valve to select between a bypass mode and an assist mode for a second actuator;
- opening a delta pressure sense valve to cause the mode select valve to select the other one of said modes for the second actuator;
- using the first actuator to provide the actuation power for the aircraft flight control surface when the second actuator is in the bypass mode; and
- using the first and second actuators to provide the actuation power for the aircraft flight control surface when the second actuator is in the assist mode.

* * * * *

UNITED STATES PATENT AND TRADEMARK OFFICE
CERTIFICATE OF CORRECTION

PATENT NO.     : 6,685,138 B1
DATED          : April 15, 2004
INVENTOR(S)    : Richard M. Krantz It is certified that error appears in the above-identified patent and that said Letters Patent is hereby corrected as shown below:

<u>Title page,</u>
Item [56], References Cited,
U.S. PATENT DOCUMENTS, please insert the following reference:
-- 2,627,847   02/10/1953   Clark et al.
 3,507,352   04/21/1970   Williamson
 3,602,102   08/31/1971   Fenari
 3,724,333   04/03/1973   Fonden et al.
 3,943,968   03/16/1976   Treichler
 3,952,825   04/27/1976   Beyers
 3,992,979   11/23/1976   Smith
 4,201,509   05/06/1980   Hansen
 4,232,588   11/11/1980   Ziplies et al.
 4,531,448   07/30/1985   Barnes
 4,779,822   10/25/1988   Burandt et al.
 5,074,495   12/24/1991   Raymond
 5,538,202   07/23/1996   Thornburg --;

FOREIGN PATENT DOCUMENTS,
-- EP 0 657 656 B1    03/22/2000 --; and

OTHER PUBLICATIONS,
-- Article by Avtar Hayre (Northrop Corporation); Tom Dull (Northrop Corporation); Fred Meyn (GE Aircraft) published by American Institute of Aeronautics Astronautics, Inc., with permission (92-1076 ATF YF25 Leaf4 1/31) (7 pages) --

Signed and Sealed this

Sixth Day of July, 2004

JON W. DUDAS
*Acting Director of the United States Patent and Trademark Office*